United States Patent
Shire et al.

(10) Patent No.: US 12,531,814 B2
(45) Date of Patent: Jan. 20, 2026

(54) OPTIMISING MAXIMUM TRANSMISSION UNITS FOR VEHICLE-SATELLITE COMMUNICATIONS

(71) Applicant: VOLVO TRUCK CORPORATION, Gothenburg (SE)

(72) Inventors: Joshua Shire, Gothenburg (SE); Ove Oldberg, Alingsås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 425 days.

(21) Appl. No.: 18/332,333

(22) Filed: Jun. 9, 2023

(65) Prior Publication Data

US 2023/0403238 A1 Dec. 14, 2023

(30) Foreign Application Priority Data

Jun. 10, 2022 (EP) .................................... 22178483

(51) Int. Cl.
*H04L 47/36* (2022.01)
*H04W 64/00* (2009.01)
*H04W 84/06* (2009.01)

(52) U.S. Cl.
CPC .......... *H04L 47/365* (2013.01); *H04W 64/00* (2013.01); *H04W 84/06* (2013.01)

(58) Field of Classification Search
CPC ...... H04L 47/365; H04L 47/36; H04W 64/00; H04W 84/06; H04B 7/18554; H04B 7/18513
See application file for complete search history.

(56) References Cited

U.S. PATENT DOCUMENTS

| 6,157,896 A | 12/2000 | Castles et al. |
| 2015/0131512 A1 | 5/2015 | Lauer et al. |
| 2015/0318916 A1 | 11/2015 | Gopal et al. |
| 2017/0366252 A1* | 12/2017 | Caudill .............. H04B 7/18586 |

(Continued)

OTHER PUBLICATIONS

Satellite Communication System Onboard Spanish Oceanographic Vessels, IEEE, 2009 D.Afonso et al (Year: 2009).*

(Continued)

*Primary Examiner* — Habte Mered
(74) *Attorney, Agent, or Firm* — Jeffri A. Kaminski; Venable LLP

(57) ABSTRACT

A method of controlling communications includes at a server determining a current vehicle geographic location, determining a communications channel is available for the vehicle at the determined current vehicle location, dynamically adjusting a maximum transmission unit, MTU, used by the vehicle for communications over the available communications channel based on a predicted optimal MTU determined from a current time and geographic location of the vehicle. The adjusted MTU setting may be dependent on whether a communications comprises a mobile originating, MO, message sent by the vehicle or a mobile terminating, MT, message received by the vehicle, and sending the adjusted MTU for the satellite communications channel to the vehicle. The dynamic adjustment of the MTU increases the data volume which can be communicated between the vehicle and a communications satellite using the respective current or next available satellite-communications channel.

20 Claims, 6 Drawing Sheets

(56) References Cited

U.S. PATENT DOCUMENTS

| | | |
|---|---|---|
| 2020/0008122 A1 | 1/2020 | Radko et al. |
| 2020/0053577 A1 | 2/2020 | Sundar |
| 2022/0158722 A1 | 5/2022 | Trutna et al. |
| 2023/0284089 A1* | 9/2023 | Guduru ................. H04W 28/24 |

OTHER PUBLICATIONS

European Search Report dated Mar. 10, 2023 in corresponding European Patent Application No. 22178483.8, 16 pages.

\* cited by examiner

OPTIMISING MAXIMUM TRANSMISSION UNITS FOR VEHICLE-SATELLITE COMMUNICATIONS

The present disclosure relates to a method for optimizing maximum transmission units, MTUs, used for vehicle-satellite communications and to related aspects.

In particular, but not exclusively, the present disclosure relates to a method of optimizing MTUs for incoming messages and outgoing messages which are sent over a satellite communications channel used for data communications with a satellite-connected vehicle and to related aspects.

BACKGROUND

On certain satellite networks, satellite are only overhead for a short period. These periods are predictable based on where the satellite is. In some situations, however, for example, where there is only marginal satellite network coverage, there may be only a narrow time-window where a satellite connected vehicle has an opportunity to transmit and in particular to receive messages. It is desirable accordingly if communications are made as efficiently as possible during any time-windows where a direct vehicle to satellite communications link can be established.

The disclosed technology seeks to mitigate, obviate, alleviate, or eliminate various issues known in the art which affect the ability of a vehicle to use a satellite-communications network.

SUMMARY STATEMENTS

Whilst the invention is defined by the accompanying claims, various aspects of the disclosed technology including the claimed technology are set out in this summary section with examples of some preferred embodiments and indications of possible technical.

A vehicle using a satellite connection in such circumstances, the maximum transmission unit, MTU, may be optimized to permit the highest overall end to end throughput. In other words, to maximise the total volume of successful messages communicated over a set period within a time-window when a satellite is available for vehicle-satellite communications the length of the message transmitted at any time is ideally adjusted. The term vehicle-satellite communications as used herein refers to communications between a vehicle and a communications satellite in one or both directions, in other words communications both from the vehicle to the satellite and from the satellite to the vehicle. Too small an MTU results in suboptimal performance as the message overhead (e.g. network signalling, headers, metadata, etc.) becomes an increasingly large percentage of the overall data transmitted in an available time-window. Too large an MTU however may reduce the percentage of overhead vs message content, but a message may not be completely transmitted if the transmission window for vehicle-satellite closes before the message has been fully received.

In areas of marginal coverage by a satellite system, for example, where the position of the vehicle combined with the orbits of one or more communication satellites results in a very short period when any individual satellite may be in view of the vehicle, the transmission time-window for vehicle-satellite communications tends to be very short. However, in areas of better coverage, the transmission window may be comparatively very long as rather than just appear for a short time on the horizon the satellite will pass fully from horizon to horizon overhead.

A first aspect of the disclosed technology comprises a method of controlling communications over a satellite communications channel used by a satellite-communications enabled vehicle, the method comprising determining a current vehicle geographic location, determining satellite-communications channel availability for the vehicle at the determined current vehicle location, and dynamically adjusting a maximum transmission unit, MTU, used by the vehicle for communications over the current or next available satellite-communications channel based on a predicted optimal MTU for the geographic location of the vehicle and the determined satellite-communications channel availability.

The MTU may be dynamically adjusted to improve the efficiency of the current or next satellite-communications channel to allow more data to be communicated between the vehicle and a satellite using the satellite-communications channel Advantageously, by maximizing the MTU so it is optimized to permit the highest overall end to end throughput, the total volume of successful messages communicated over a set period can be maximized. The method accordingly seeks to prevent using MTUs which are too small for a given satellite-communications channel, as this could result in suboptimal performance as the overhead (e.g. network signaling, headers, metadata, etc.) becomes an increasingly large percentage of the overall data transmitted. The method also seeks to avoid using MTUs which are too large, as then a message may never be transmitted if the time-window for vehicle-satellite communications, by which is meant communications from the vehicle to the satellite and/or vice versa, is too small as the transmission window may close before the message has been fully received by the satellite.

Beneficially, the disclosed method may also provide a better service in some areas of marginal network coverage by a satellite system, e.g. where the position of the vehicle combined with the orbits of the satellites result in a very short period when any individual satellite may be in view. In such situations, when the time-window for direct, in other words, line of sight vehicle-satellite transmission links, tends to be very short, it is useful if messages are sent in shorter MTUS than those which may be used in areas of better coverage. In areas of better satellite network coverage, the transmission window may be comparatively very long as rather than just appear for a short time on the horizon. the satellite will pass fully from horizon to horizon overhead, which case a larger MTU may be used.

In some embodiments, wherein the adjusted MTU is dependent on whether a communications comprises a mobile originating, MO, message sent by the vehicle or a mobile terminating, MT, message received by the vehicle.

In some embodiments, the method further comprises adjusting the optimal MTU for communications in one direction between a server, which may also be referred to from time to time as a server system herein, and the vehicle over the satellite-communications channel, and adjusting the optimal MTU differently for communications in the other direction between the server and the vehicle.

In some embodiments, wherein the MTU is dynamically adjusted based on a predicted MTU determined from the current geographic location of the vehicle and one or more predicted characteristics of the current communications channel.

In some embodiments, the method further comprises storing at least one default optimal MTU for one or more predetermined areas over which the orbit of the communications satellite passes.

In some embodiments, the at least one default MTU settings for vehicle-satellite communications for the one or more predetermined areas comprises a default MTU setting for mobile terminating, MT, messages, and a different default MTU setting for mobile originating, MO, messages. The default settings may be stored in association with a communication channel identifier as extended communication settings for the vehicle.

In some embodiments, the method is performed by the vehicle.

In some embodiments, the method is performed by a server.

In some embodiments, the method further comprises receiving, at the server, a request from the vehicle, for a predicted optimal MTU for the satellite communications, and sending an adjusted MTU for the satellite communications channel to the vehicle in response to processing the received request.

In some embodiments, the method further comprises receiving a location of the vehicle determined by the vehicle's positioning system and/or obtaining the location of the vehicle directly from a gateway to a satellite network.

In some embodiments, the default settings are stored by the server in association with a communication channel identifier and a vehicle chassis identifier as extended communication settings for the vehicle, and the method further comprises at the server retrieving, using the vehicle chassis identifier, an MTU associated with that vehicle chassis identifier, to use when transmitting a MT message over a satellite communication channel to a vehicle.

In some embodiments, the method further comprises at the server automatically updating one or more MTU settings for the vehicle responsive to receiving an indication that the geographic location of the vehicle has changed to an area associated with at least one different MTU settings.

In some embodiments, the method further comprises determining a stored default MTU setting item has changed based on a satellite location, and sending to a vehicle having a vehicle chassis identifier associated with the stored default MTU setting, a message indicating the new MTU setting.

In some embodiments, the vehicle is configured to detect unobstructed sky, for example, visible sky, to further adjust the predicted start and end of the time-window for vehicle-satellite communications, and the vehicle adjusts the optimal MTU of at least outgoing messages, and the method further comprises at the server receiving a message from the vehicle, determining an adjusted optimal MTU has been used for the message sent by the vehicle to the server, and based on the adjustment, adjusting the optimum MTU for messages sent to the vehicle.

Another aspect of the disclosed technology relates to a satellite-communications enabled vehicle, the vehicle comprising: a satellite modem, a transceiver/antenna arrangement, one or more processors or processing circuitry, a memory, and an electronic control system, ECU, (410), wherein the vehicle is configured to receive new default MTU settings for a satellite communications channel, wherein the new default MTU settings are based on: a current vehicle geographic location, satellite-communications channel availability for the vehicle at the determined current vehicle location, and a dynamically adjusted a maximum transmission unit, MTU, for use by the vehicle for communications over the current or next available satellite-communications channel based on a predicted optimal MTU for the geographic location of the vehicle and the determined satellite-communications channel availability.

In some embodiments, the satellite-communications enabled vehicle is configured to receive the new default MTU settings for a satellite communications channel from a remote server performing a method according to the method aspect or any of its embodiments disclosed herein, wherein, the vehicle is configured automatically, on receipt of a new MO MTU setting message from the remote server, to use the new setting for MT messages transmitted over the satellite communications channel.

In some embodiments, the vehicle is further configured to maintain an on-board mapping of the optimal MTU for an off-line communications channel based on its geographic location at a given time.

In some embodiments, the vehicle is configured to determine unobstructed, for example visible, sky at its location, based on the determined unobstructed sky, further adjust a predicted start and end of a time-window for vehicle-satellite communications; and based on the adjusted time-window, adjust the outgoing message optimal MTU.

In some embodiments, the vehicle is configured to determine the unobstructed sky by using one or more sensor systems to distinguish sky from surrounding terrain.

In some embodiments, the vehicle is configured to determine the unobstructed sky by obtaining topographical information for terrain surrounding the vehicle location.

Another aspect of the disclosed technology comprises apparatus configured to control satellite-communications between a server and a satellite-communications enabled vehicle, the apparatus comprising memory, one or more processors or processing circuitry, and computer program code stored in the memory, wherein the computer program code is configured, when loaded from the memory and executed by the one or more processors or processing circuitry to cause the apparatus to implement a method according to the first aspect or any one of its embodiments disclosed herein.

In some embodiments, the apparatus is the server.

In some embodiments, the server is a back-office server for the vehicle.

In some embodiments, the apparatus is instead the vehicle.

In some embodiments, the vehicle is a heavy-duty vehicle.

In some embodiments, the vehicle or heavy duty vehicle may an autonomous, semi-autonomous, or remotely controlled or driven vehicle.

Another aspect of the disclosed technology comprises a computer-program product comprising computer code, which, when loaded from a memory and executed by one or more processors or processing circuitry of an apparatus, causes the apparatus to implement a method according to the method aspect or any one of its embodiments disclosed herein.

Another aspect of the disclosed technology comprises a server configured to control satellite-communications by a satellite-communications enabled heavy-duty vehicle, the system comprising memory, one or more processors or processing circuitry; and computer program code stored in the memory, wherein the computer program code is configured, when loaded from the memory and executed by the one or more processors or processing circuitry, causes the server to implement a method according to the first aspect or any suitable one of its embodiments disclosed herein.

Another aspect of the disclosed technology comprises a computer-program product comprising computer code, which, when loaded from a memory and executed by one or more processors or processing circuitry of a server cause the server to implement a method according to the first aspect or any suitable one of its embodiments to control vehicle-satellite communications by a satellite-communications vehicle.

Another aspect of the invention comprises a computer-readable storage medium comprising computer-program code which, when executed by one or more processors or processing circuitry of an apparatus, causes the apparatus to implement a method according to the first aspect or any suitable one of its embodiments disclosed herein.

Another aspect of the disclosed technology relates to a computer program carrier carrying a computer program comprising computer-program code, which, when loaded from the computer program carrier and executed by one or more processors or processing circuitry of an apparatus causes the apparatus to implement a method according to the first aspect or any one of its embodiments disclosed herein, wherein the computer program carrier is one of an electronic signal, optical signal, radio signal or computer-readable storage medium.

Another aspect of the disclosed technology relates to a control system or circuitry of a vehicle, the control system comprising memory, one or more processors or processing circuitry, and computer-program code which, when loaded from memory and executed by the one or more processors cause the control system or circuitry to implement a method according to the first aspect or any one of its embodiments disclosed herein.

The disclosed aspects and embodiments may be combined with each other in any suitable manner which would be apparent to someone of ordinary skill in the art.

BRIEF DESCRIPTION OF THE DRAWINGS

Some embodiments of the disclosed technology are described below with reference to the accompanying drawings which are by way of example only and in which.

DETAILED DESCRIPTION

Figure 1:
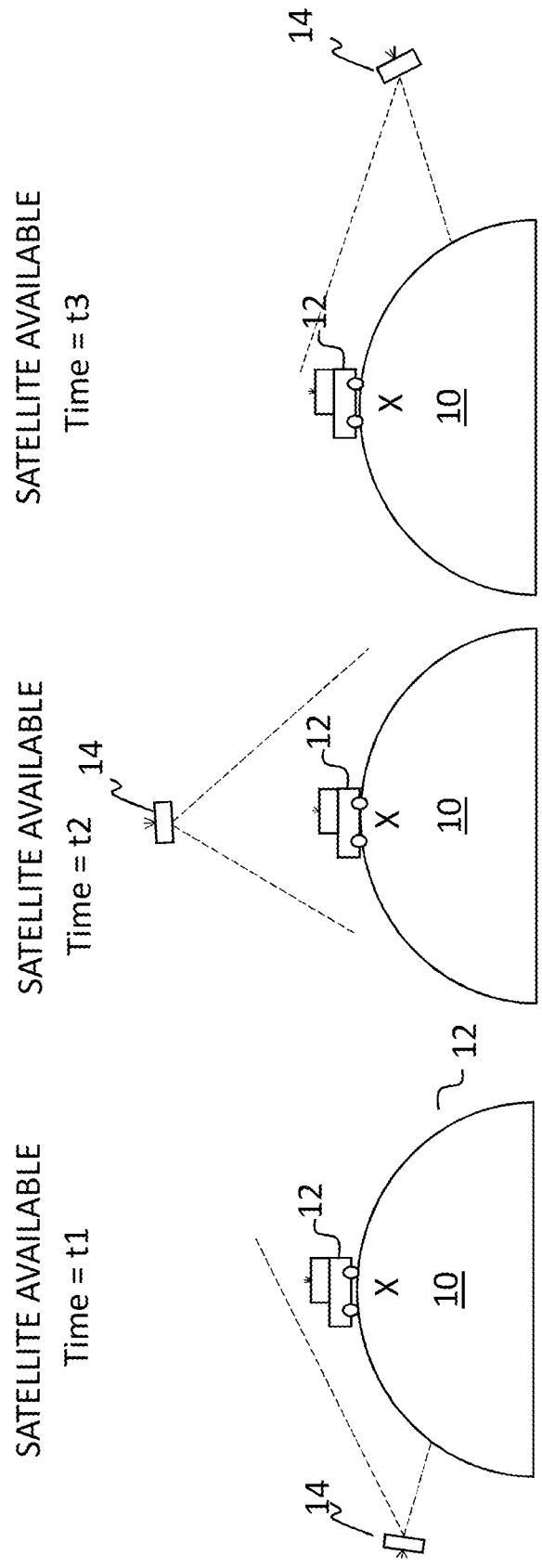
FIGS. 1A to 1C illustrate schematically an example time-window of vehicle-satellite communications availability.
Figure 2:
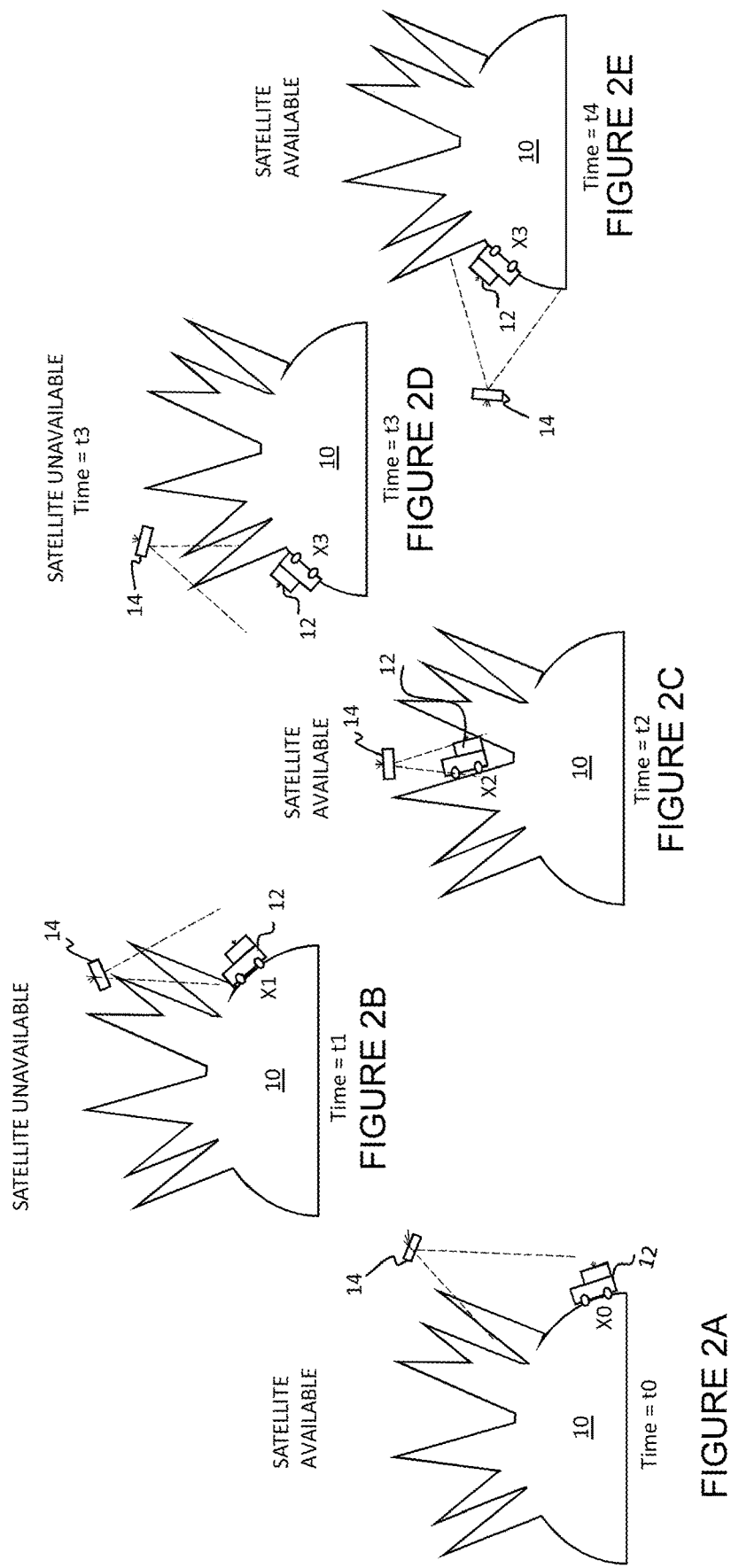
FIGS. 2A to 2E illustrate schematically other example time-windows of vehicle-satellite communications availability.

Various aspects and embodiments of the present disclosure will be described more fully hereinafter with reference to the accompanying drawings. The apparatus and method disclosed herein can, however, be realized in many different forms and should not be construed as being limited to the aspects set forth herein. Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only, and is not intended to limit the disclosed technology embodiments described herein. As used herein, the singular forms "a", "an" and "the" are intended to include the plural forms as well, unless the context clearly indicates otherwise.

FIGS. 1A to 1C and 2A to 2C of the accompanying drawings illustrate schematically examples of time-windows for vehicle-satellite communications availability. FIGS. 1A to 1C show schematically a long window for communications between a satellite-communications enabled vehicle 12 and a communications satellite 14 is possible over the time-window starting at t1 and ending at t3. In FIG. 1A, for example, at time t1, where the satellite is close to the horizon, the satellite can still directly communicate with the vehicle 12, which is shown as a stationary vehicle 12 at location X in FIG. 1A. In FIG. 1A, the satellite's orbital position and the vehicle's location on the Earth's and the surround topography of the terrain has not blocked a direct link, in other words a line-of-sight communications channel, between the satellite 14 and the vehicle 12.

FIG. 13 shows at time t2, the vehicle has not moved and in this example, the satellite's orbit passes over the vehicle's location X and vehicle-satellite communications remain possible via a direct link between the vehicle 12 and the overhead satellite 14. FIG. 1C shows that later at time t3, when the satellite 14 has moved along its orbit and is now near the horizon again, the satellite's network coverage is sufficiently large for the satellite to still be able to communicate with the vehicle 12 as the satellite has remained within a line-of-sight of the vehicle such that direct vehicle-satellite communications are still possible.

The large transmission time-window means that transmissions are less likely to be interrupted in the scenario shown in FIGS. 1A to 1C than in the scenario shown in FIGS. 2B to 2D described later below. In the scenario shown in FIGS. 1A to 1C, messages sent to and received by the vehicle 12 using the satellite network may be sent accordingly using relatively large MTUs, in other words, data can be sent in large chunks at time t1, and it is likely all of the chunks of data will be received before the communications window ends sometime after time t3. The large MTUs also allow a higher amount of content to be sent in a message compared to messaging overhead and header information etc.

FIGS. 2A to 2E show in contrast schematically an example of a scenario where the duration of available time-windows varies along a vehicle's trajectory. At first at location X0, time t0, the vehicle is at a location where the extent of network coverage from satellite 14 allows for relatively large MTUs as the time-window is large. However, at time t1, the vehicle 12 has moved to location X1, and the satellite has moved so that there is no line of sight. The next available time-window shown with the vehicle at location X2 at time t2 is much shorter than that shown in FIGS. 1A to 1C due to the topology of the terrain (not drawn to scale) around the vehicle 12 and also due to the satellite's orbit. By time t3, the vehicle has moved to location X3 and there is no line of sight between the satellite and the vehicle. By time t4, however, although in this example scenario the vehicle has not moved, there is a line of sight now available between the vehicle and the satellite. The vehicle is now within the area of network coverage of satellite 14 as satellite has moved on its orbit. This means that messages with relatively large MTUs may be sent during the time-window for vehicle-satellite communications starting at time t4, however, messages with a relatively large MTU may not be fully sent or received between the satellite and the vehicle in the short time-window shown in FIG. 2C, whereas a message with a relatively short MTU may be more likely to be successfully received or sent.

Accordingly, the topology of the terrain around a vehicle, in other words, the amount of unobstructed sky, the path of a satellite through the unobstructed sky, and the movement of the vehicle over the terrain may all affect the line of sight between the vehicle and the satellite and so affect the duration of any time-window when a direct link between a vehicle and a communications satellite can be formed.

For example, in FIG. 2B, at location X1, the vehicle's line of sight to form a direct satellite link with communications satellite 14 is shown schematically being blocked by the topology of mountainous terrain. FIG. 2C shows schematically the vehicle having moved to a location X2 in a deep depression or valley within mountainous terrain and shows how this has limited the time-window for vehicle-satellite communications. FIG. 2D shows schematically how movement of the vehicle and the satellite's orbit results in the line of sight between the vehicle 12 and the satellite 14 being blocked for direct satellite communications at location X3 due to the intervening topology of the surrounding mountainous terrain.

This means that if the vehicle continued to send data using large MTUs at time t1, there is a chance that not all of an MTU will have successfully been sent or received by the vehicle 12 before the transmission time-window closes sometime after t3. A shorter MTU is more likely to be successfully transmitted when the time-window is small as is shown schematically by FIGS. 2B to 2D. However, if the vehicle 12 continues to use the shorter MTU for messages sent after time t4, as shown in FIG. 2E, the transmissions will be less efficient in terms of data content transferred relative to message overhead than they could be as messages with larger MTUs could start to be used at that location after time t4.

FIGS. 1A-2E accordingly collectively demonstrate that in any 24-hour period based on the vehicle location and surrounding terrain characteristics, as well as the orbital path of the satellite, direct vehicle-satellite communications may be limited to one or more time-windows of various durations may be available. Sometime-windows may be short periods of time and some longer in any 24-hour period when the satellite's orbital position is sufficiently over the vehicle's geographic location on the Earth.

In some scenarios, depending on the topology of the vehicle's environment, for example, in certain areas of terrain, such as in mountainous terrain, or in a depression such as a valley or open-cast mine or the like, only a very short period of time may be available in any 24 hour period for satellite communications.

Vehicles, particularly heavy-duty vehicles such as trucks and mining equipment, which are operating in such sites and locations, may accordingly have a relatively short period of time for satellite communications compared to vehicles which are located in more open terrain at different geographic locations such as FIGS. 1A to 1C showed schematically. To allow for more efficient communications in terms of managing the relative amount of messaging overhead to message content, different sizes of MTUs may be better suited to different geographic locations based on the local topology and times-of-day when data transmissions are sent using vehicle-satellite communications channels.

Beneficially, the method 300 described later below may provide a better service in some areas of marginal network coverage by a satellite system, e.g. where the position of the vehicle combined with the orbits of the satellites result in a very short period such as FIGS. 2B-2D show schematically, when only one individual satellite may be in view for a limited period of time. In such situations, when the time-window for direct, in other words, line of sight vehicle-satellite transmission links, tends to be very short, it is useful if messages are sent in shorter MTUs than those which may be used in areas of better network coverage. In areas of better satellite network coverage, the transmission window may be comparatively very long as rather than just appear for a short time on the horizon the satellite will pass fully from horizon to horizon overhead, for example, see also FIGS. 1A-1C, which case a larger MTU may be used. It is also possible for a vehicle to be configured to use links with more than one satellite, however, satellite communicates with a satellite when the satellite and vehicle share a line of sight with each other. The ability to communicate with multiple satellites may increase the number of time-windows in any 24 hour period in some scenarios, but if the satellites are configured to overlap their network coverage, it may also increase the time-window for vehicle-satellite communications in other scenarios.

The disclosed technology seeks to make communications during any time-window where vehicle-satellite communications are available as efficient as possible by optimizing the maximum transmission unit, MTU so that more data can be sent and received during the available time-window. This also has the technical benefit of optimizing the operational efficiency of the vehicle during the time-window by allowing more data to be sent to and received from a remote server.

Figure 3:
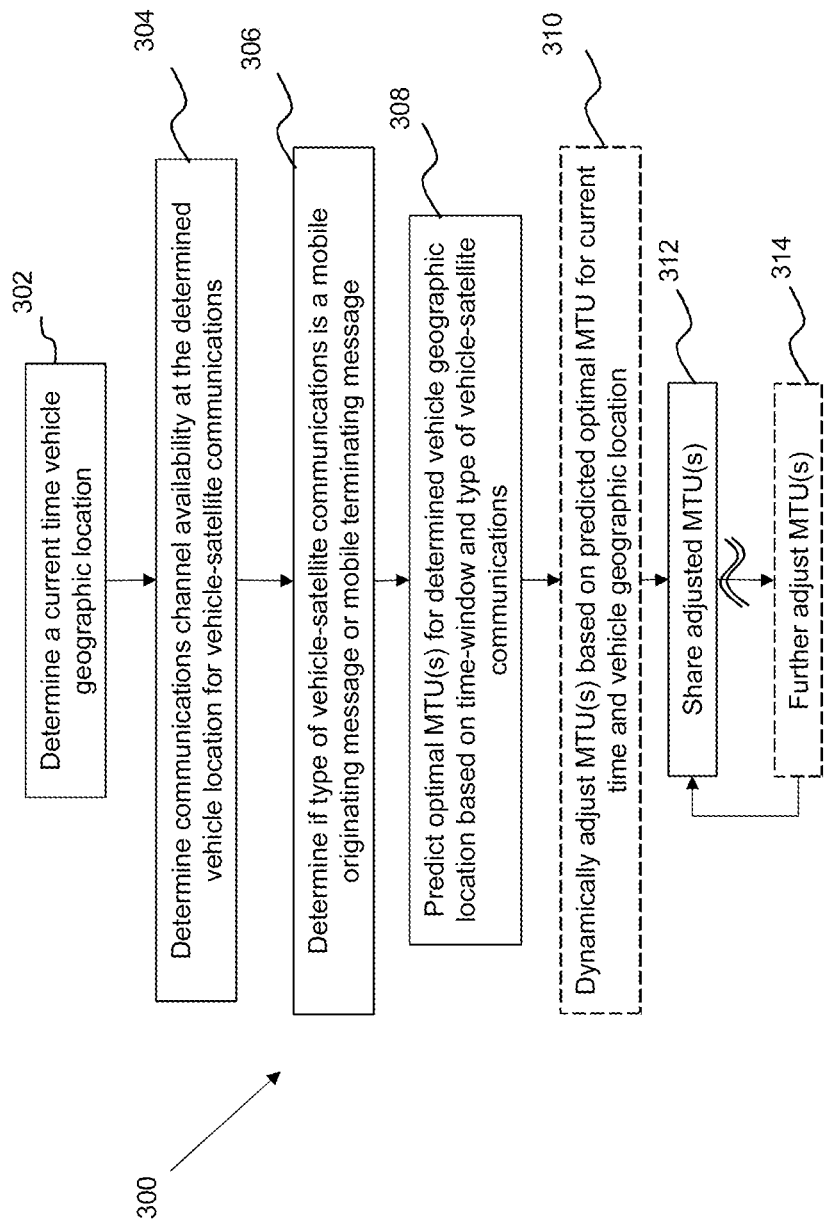
FIG. 3 illustrates schematically a method for controlling communications over a vehicle satellite-communications channel according to some embodiments of the disclosed technology.

FIG. 3 illustrates schematically a method for controlling communications over a vehicle satellite-communications channel according to some embodiments of the disclosed technology. As shown in FIG. 3, the method may be performed by the vehicle 12 or at a remote server, such as a back-office server for the vehicle 12. The method comprises first determining a current time vehicle geographic location in 302, then determining at least the start of a vehicle-satellite communications channel availability time-window in 304, then determining the type of message to be sent using vehicle-satellite communications, for example, if the message is a mobile terminating message or a mobile originating message in 306. Based on the type of message, the method then predicts an optimal MTU for the current time vehicle geographic location in 308, and then dynamically adjusts in 310 the MTU the vehicle will use to send and receive messages over the vehicle-satellite communications channel based on the predicted optimal MTU for the current time and vehicle location. The adjusted MTU is then sent to the vehicle in 312 if the server has performed the method, or is sent to the server 400 if the vehicle has performed the method.

Some example embodiments of the method 300 comprise controlling communications over a satellite communications channel used by a satellite-communications enabled vehicle 12 where the method comprises either at the vehicle 12 or at a server 400 (see FIGS. 4 and 5 for more information), determining a vehicle location, for example, a current vehicle geographic location, determining a communications channel is available for the vehicle at the determined vehicle location, for example, the current vehicle location 302, dynamically adjusting 310 at least one maximum transmission unit, MTU, to be used by the vehicle for communications over the available communications channel based on a predicted optimal MTU determined from a future or current time and geographic location of the vehicle. The adjusted MTU may be dependent on whether a communications comprises a mobile originating, MO, message sent by the vehicle or a mobile terminating, MT, message received by the vehicle; and sending the adjusted MTU for the satellite communications channel to the vehicle.

In some embodiments, determining a communications channel is available for the vehicle 12 comprises predicting at least a start time of a time-window for when a satellite will next be available for vehicle satellite-communications based on the determined geographic location of the vehicle. At the same time, or subsequently, the end time of the time-window may also be determined.

In some embodiments, determining a communications channel is available for the vehicle at the determined current vehicle location 302 is performed by the vehicle based on satellite availability scheduling information provided by a server 400, for example, based on information obtained at some previous point from a satellite information source.

In some embodiments, instead or in addition, the vehicle 12 detects unobstructed sky to determine a time-window for vehicle-satellite communication using topology information for its location. This allows in some embodiments for the determining at least a start time when a satellite will next be available for vehicle satellite-communications based on the determined geographic location of the vehicle to comprise the vehicle detecting unobstructed sky to determine a time-window for vehicle-satellite communication using one or more image or infra-red or similar sensors such as radar or LIDA to scan for unobstructed sky. The sensors may have any suitable form for distinguishing unobstructed sky during the day and/or night in some embodiments.

Typically, the server 400 comprises a back office system, BOS, used by the vehicle. For example, heavy-duty vehicles and other vehicles which may be autonomous or semi-autonomous or remote controlled may be monitored at a back-office system comprising server 400.

The server 400 may also receive a request from the vehicle, for a predicted optimal MTU for the satellite communications, and may send an MTU for the satellite communications channel to the vehicle is in response to processing the receive request.

The method 300 may also include using a different adjusted MTU for subsequent communications from the server 400 to the vehicle 12 over a communications channel from the adjusted MTU used for subsequent communications from the vehicle to the server over the communications channel.

The MTU may be dynamically adjusted based on a predicted MTU determined from the current geographic location of the vehicle and one or more predicted characteristics of the available communications channel in some embodiments. Examples of predicted characteristics of the communications channel include time the satellite is in view, and the expected throughput of data during that time.

The server 400 may receive a location of the vehicle determined by the vehicle's positioning system. For example, the vehicles GPS positioning system may be used to report the vehicle's position to a back office. This location information is, together with the satellite orbit location information, used to determine a time-window for vehicle-satellite communications.

In some embodiments, however, the server 400 can obtain the location of the vehicle from a gateway to the satellite network. In other words, the satellite system itself may be able to locate the vehicle independent of a standalone geolocation service in some embodiments.

The method 300 may also include storing at least one default optimal MTU for one or more predetermined areas, such as countries or regions, over which the orbit of the communications satellite passes in some embodiments.

In some embodiments of the method, the server 400 configures the vehicle 12 or the vehicle configures itself to use at least one of the default MTU settings for vehicle-satellite communications for the one or more predetermined areas which comprises a default MTU setting for mobile terminating, MT, messages. A different default MTU setting is sent to the vehicle which is to be used by the vehicle for mobile originating, MO, messages. The MO messages can be stored when the satellite-modem is off-line or in a lower power state in an outgoing satellite modem buffer, which may be separately powered from the satellite modem. The MO messages are stored in association with a communication channel and a vehicle chassis identifier at the server as extended communication settings for the vehicle in some embodiments.

In some embodiments of the method 300, the server 400: retrieves, using the vehicle chassis identifier, an MTU associated with that vehicle chassis identifier, to use when transmitting a MT message over a satellite communication channel to a vehicle. The server 400 may be configured to automatically update one or more MTU settings for the vehicle responsive to receiving an indication that the geographic location of the vehicle has changed to an area associated with at least one different MTU settings. In some embodiments, the method also comprises the server 400 determining a stored default MTU setting item has changed based on a satellite location and sending an update message to a vehicle having the same vehicle chassis identifier associated with the stored default MTU setting, which indicates the new MTU setting.

Figure 4C:
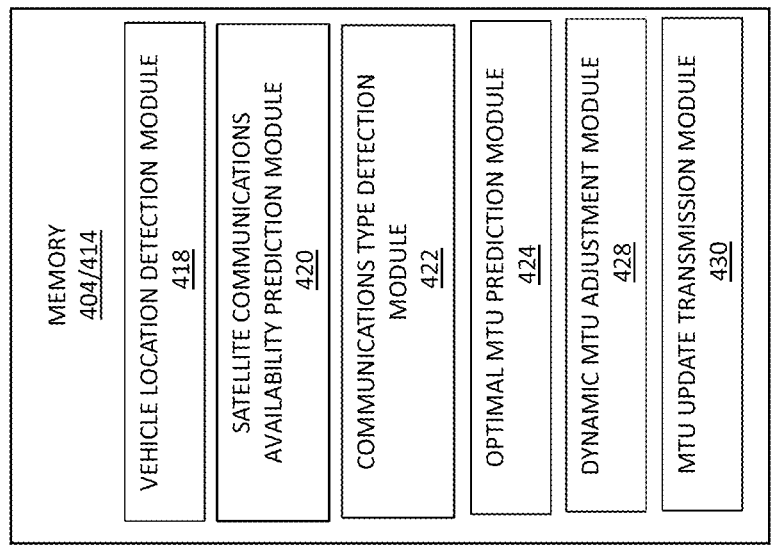
FIG. 4C illustrates schematically computer code stored in memory according to some of the disclosed embodiments.
Figure 4B:
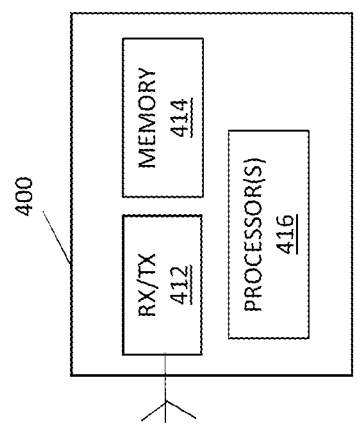
FIG. 4B illustrates schematically a server according to some of the disclosed embodiments.
Figure 5:
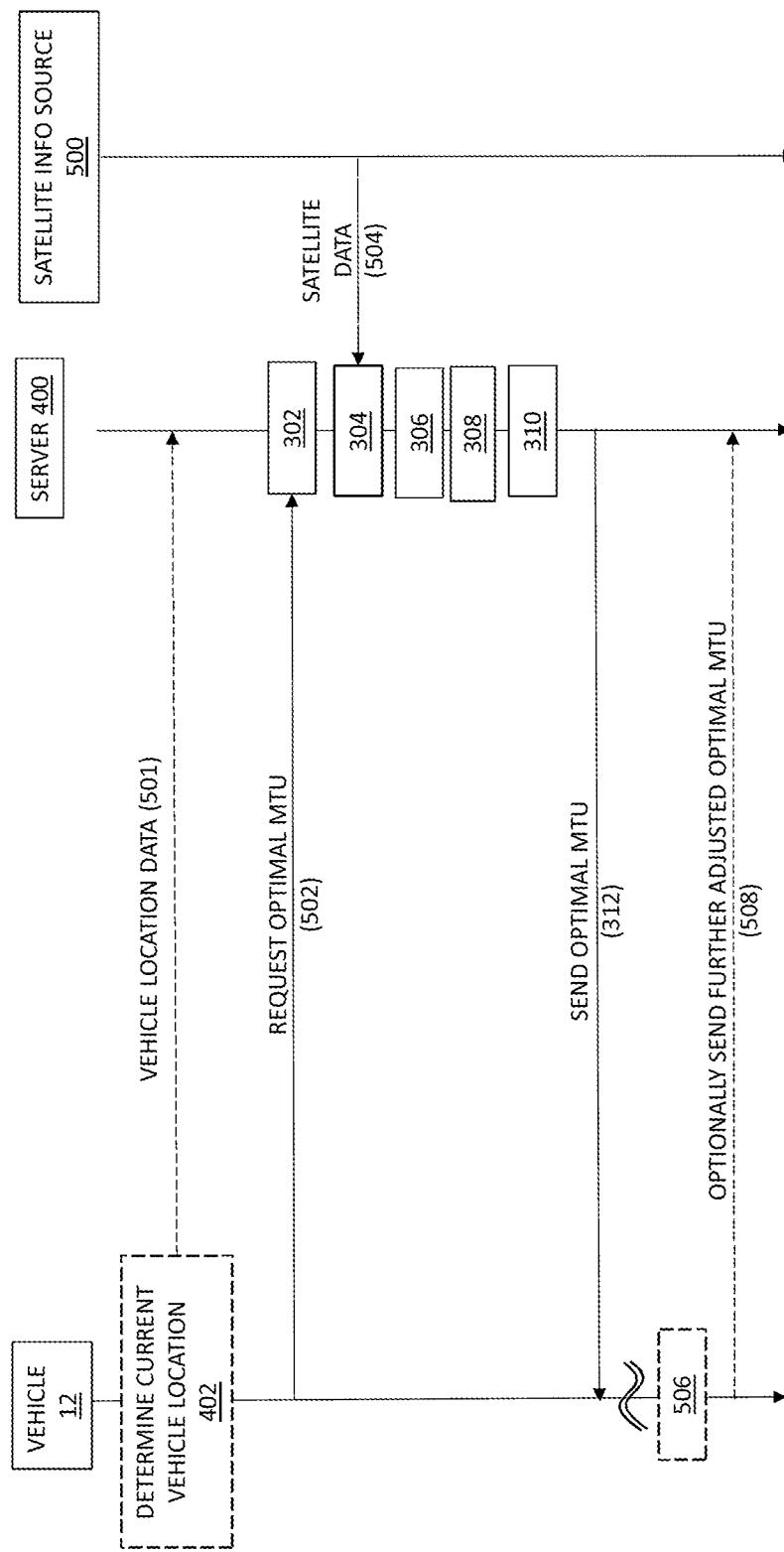
FIG. 5 illustrates schematically a data flow where a server implements a method for controlling vehicle-satellite communications according to some embodiments of the disclosed technology.

In some embodiments, method 300 is executed by a remote server such as the server 400 shown schematically in FIGS. 4B and 5 and the start and stop times of any time-window for vehicle-satellite communications may be sent by the server 400 to the vehicle 12. In some embodiments, however, as mentioned above, instead or in addition, the vehicle 12 is configured to detect unobstructed sky to further adjust a predicted start and end of the time-window for vehicle-satellite communications. This may involve the vehicle predicting the unobstructed sky based off known, as in previously stored on-board, topology for its surrounding terrain. Alternatively, or in addition, the vehicle may use its sensor system to scan for unobstructed sky. This may allow the optimum MTU to be adjusted in some embodiments.

Figure 4A:
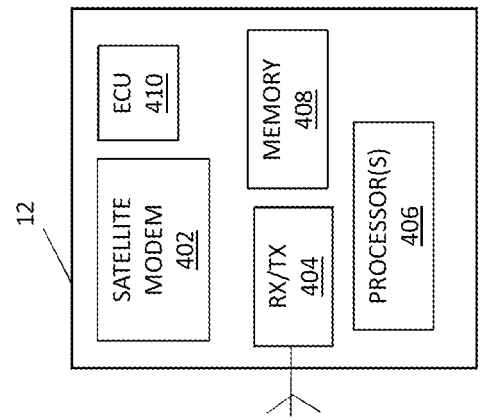
FIG. 4A illustrates schematically a vehicle configured to have its communications controlled by a method according to some of the disclosed embodiments.

FIG. 4A illustrates schematically an example embodiment of a vehicle 12 configured to have its communications controlled by a server 400 using an embodiment of the method shown schematically in FIG. 3 or to control its own communications using an embodiment of the method if it can scan for unobstructed sky.

As shown in the example embodiment of FIG. 4A, the satellite-communications enabled vehicle 12 comprises a satellite modem 402, a suitable transceiver/antenna arrangement 404, one or more processors or processing circuitry 406, a memory 408 and an electronic control system or unit, ECU 410.

The satellite-communications enabled vehicle 12 may be configured to receive new default MTU settings for a satellite communications channel from a server 400 performing a method 300. In other words, the vehicle may be configured to automatically, for example, on receipt of a new MO MTU setting message from the remote server, to update its default setting to the new setting and to use the new setting for subsequent MT messages transmitted over the satellite communications channel. In other words, in some embodiments, the vehicle 12 is configured to maintain an on-board mapping of the optimal MTU for an off-line communications channel based on its geographic location at a given time.

In some embodiments, however, as mentioned above, the vehicle is configured to detect or determine unobstructed sky at its location, which may be predicted for using stored topography data for its location and sky data. Based on the detected unobstructed sky which spans the satellite's orbit, the vehicle may determine or further adjust a predicted start and end of a time-window for vehicle-satellite communications and use this to adjust the outgoing message optimal MTU. In some embodiments, instead or in addition to using stored topography and sky data, the vehicle may use its own sensory systems to scan the unobstructed sky in its surroundings to make adjustments to the optimal MTU.

In embodiments where the vehicle 12 is configured to detect unobstructed sky and determine the extent to which the satellite's orbit will pass over the unobstructed sky, the vehicle may also determine or further adjust the predicted start and end of the time-window for vehicle-satellite communications, and adjusts the optimal MTU of at least outgoing messages, in which case, method 300 may also comprise the server 400 receiving a message from the vehicle which shares 312 the adjusted MTU, and the server 400 then detects an adjusted optimal MTU has been used for the outgoing message sent by the vehicle 12 to the server 400. Based on the detected MTU adjustment, the server 400 may further adjust in 314 the optimum MTU for messages sent to the vehicle 12 via satellite 14.

In some embodiments, the vehicle may be configured to independently decide on the MTU for MO or MT messages from the default MTU indicated by a server.

FIG. 4B illustrates schematically an example embodiment of a server 400 configured to implement an embodiment of the method 300 shown schematically in FIG. 3. The term "server" also refers to a server system, which may be distributed such as a cloud-based server system. The server 400 may comprise a server located at a back-office configured to manage a fleet of one or more vehicles, including the vehicle which is also configured to control satellite-communications by a satellite-communications enabled vehicle 12.

The server 400 comprises one or more forms of suitable memory 414, one or more processors or processing circuitry 416, and a suitable transceiver/antenna arrangement 412. The server 400 also comprises computer program code stored in the memory 414, for example, the computer program code shown schematically in the form of modules or circuitry 418 to 430 in FIG. 4C.

The computer program code is configured, when loaded from the memory 414 and executed by the one or more processors or processing circuitry 416, to cause the server 400 to implement a method 300 according to the disclosed embodiments to control vehicle-satellite communications by a satellite-communications vehicle 12.

In some embodiments, the server 400 is a back-office server for the vehicle 12. In some embodiments, the server 400 is a server distributed over a number of different hardware platforms. In some embodiments, the server 400 is a cloud-based server.

FIG. 4C illustrates schematically a computer code comprising a vehicle location detection module 418, a satellite communications availability prediction module 420, a communications type detection module 422, an optimal MTU prediction module 424, and a dynamic MTU adjustment module 428, and a MTU update transmission module 430 which are stored in memory 404,414 of an apparatus such as the server 400 for execution by the processors of the server 400 in some embodiments but in other embodiments, the apparatus comprises vehicle 12 and the computer code is stored in memory 404 of the vehicle 12 and executed by the processors or processing circuitry 406 of the vehicle 12.

The computer code modules 420-430 may also be provided as a computer-program product, which, when loaded from a memory and executed by one or more processors or processing circuitry of the apparatus 12, 400 cause the apparatus 12, 400 to implement a method 300 according to the one of the disclosed embodiments.

The computer code of the vehicle location detection module 418 determines the geographic location of the vehicle in 302, but the location detection module may also predict a vehicle location in some embodiments.

Some embodiments of the computer code of the satellite communications availability prediction module 420 determine satellite.

communications channel availability at the determined current vehicle location for vehicle-satellite communications 304. In some embodiments of the disclosed technology, the computer program code which forms the communications type detection module 422 is configured to, when executed by the one or more processors 416 of the server 400, determine if the type of vehicle-satellite communications is a mobile originating message or mobile terminating message 306, some embodiments of the optimal MTU prediction module 424 predict an optimal MTU for current time vehicle geographic location based on type of vehicle-satellite communications 308.

Some embodiments of the computer code which form the dynamic MTU adjustment module 428, cause the vehicle 12 to dynamically adjust, when the computer code is executed, the MTU for the incoming and/or outgoing messages over the satellite channel with the vehicle based on the predicted optimal MTU for current time and current vehicle geographic location. In some embodiments of the disclosed technology, the MTU update transmission module 430 comprises computer code configured to, when executed, send an adjusted MTU to the vehicle 12.

In some embodiments, where memory 404 holds the modules 418 to 430 and the vehicle determines time-windows for vehicle-satellite availability, module 420 may determine a current vehicle-satellite communications availability time-window (or at least the end of a window if one is currently available) or predict a future a time-window based on the current or predicted vehicle location, the orbital position information for at least one communications satellite, and the local topology at the vehicle's location. Alternatively, or in addition, module 420 may be configured to communication with a controller of the vehicle to obtain unobstructed sky information from one or more suitable sensors of the vehicles sensor system.

When the modules 418 to 430 are loaded by the one or more processors or processing circuitry 416 of either the server 400 shown in FIG. 4B, the server 400 is caused to implement an embodiment of the method 300 shown schematically in FIG. 3. However, as mentioned above, it is possible for the vehicle 300 to implement the invention in some embodiments, in which case, the vehicle may sent to the server 400 MTU scheduling information based on the vehicles predictions of the timings and duration of available time-windows for future vehicle-satellite communications.

FIG. 5 illustrates schematically a data flow according to an embodiment of the disclosed technology between a satellite enabled vehicle 12 a server 400, shown as server 400 in FIG. 5, and a satellite information source 500, which may comprise a plurality of different data sources which may be fused as a data stream in some embodiments and provided continuously or from time to time to the server 400.

As shown in FIG. 5, the satellite data 504 may also include satellite determined vehicle information, e.g. GPS information for the vehicle 12 which the server 400 may use instead or in addition to the location data the vehicle 12 provides (shown as 501 in FIG. 5). In FIG. 5, the vehicle 12 requests an optimal MTU 502 for its next vehicle-satellite transmission window from server 400, and in response the server 400 performs method 300 including receiving satellite data 504. Alternatively, the satellite data may be provided responsive to receiving a request for information from the server 400 well in advance of performing method 300 in some embodiments, in other words, the server 400 just needs to have access to the satellite information so that it can determine to what extent the satellite's orbit will pass over and maintain a line of sight with the vehicle so a direct satellite link can be formed between the satellite and the vehicle. In some embodiments according, the satellite information comprises satellite position and network coverage information which is provided at any point prior to the server requiring such data to determine the time-window for vehicle satellite communications, which may be prior to receiving any vehicle location information in some embodiments (not shown in FIG. 5).

In some embodiments, the vehicle 12 may also or instead receive satellite orbit information to allow it to locate a satellites position in advance of performing method 300. The server 400 then shares the adjusted optimal MTU based on the vehicles current location and the satellite location with the vehicle in 312. Also shown in FIG. 5 is an optional component 506 which is if the vehicle makes an assessment or refinement of the actual available time-window for satellite to vehicle communications based on its awareness of its location and stored topology data for that location so that the actual visible sky can be determined. In some embodiments, instead or in addition, the vehicle may use suitable sensors such as optical, radar or lidar sensors to sense where the sky is visible. If the vehicle has also received satellite information in advance, either via server 400 or directly from a satellite information source such as source 500 shown in FIG. 5, it may then use the satellite information and the sense unobstructed sky to determine when the satellite will be available for satellite-vehicle communications, and based on this, it may further refine the MTUs for outgoing messages in 506, and may refine also the MTU for incoming messages in 506. In some embodiments, the vehicle then sends a message to server 400 in 508 to inform the server 400 of a further refined MTU the server should use for incoming messages.

It is also possible for the server 400 or vehicle 12 to determine how long it will take for a powered off modem to be powered on, and to adjust the time-window and optimal MTU accordingly if the modem is not controlled to start a wake-up process sufficiently in advance of the time-window for vehicle-satellite communications with a satellite becoming available. This may help limit or avoid situations where due to the time-window being very short, after a modem has powered on there is not sufficient time to successfully send or receive a message even if a very small MTU is used.

In some embodiments, where vehicle 12 comprises a satellite-modem and a telematics gateway and a power controller, the power controller may be configured to provide power to the satellite modem of the vehicle independently of the telematics gateway of the vehicle. This allows the telematics gateway to generate messages which are stored for transmission until the modem is next available to send them. The message generated whilst the modem is powered-off, operating only in a low power model, or otherwise unable to send the messages directly should ideally be generated using an MTU configured for the next available time-window, not the previous time-window.

If instead, the telematics gateway is not operational or not fully operational, incoming messages can be stored in a buffer by the modem and only forwarded to the telematics gateway when it is powered-on and operational. Advantageously, if the modem buffer for incoming messages is separately powered from the modem itself, the telematics gateway can access messages stored in the income message modem buffer even if the modem itself is not powered on or if it is in a stand-by or low power mode.

By having a satellite modem which is capable of being differently powered than the vehicle's telematics gateway, the vehicle may accordingly be configured to enter a low power mode under a variety of different circumstances.

For example, a low power mode may be activated in some embodiments responsive to an on-board power management or control system, for example, implemented as part of the vehicle's electronic control system, ECU, determining a low power mode should be activated on the vehicle. A low power mode may be triggered if the ECU receives a request for the vehicle to enter a low power mode generated by a separate vehicle power management or other vehicle system component, for example a telematics gateway of the vehicle. A low power mode may also be triggered by a remote server 400 such as a back office server if the vehicle is a fleet vehicle, such as a heavy-duty fleet vehicle, sending a request for the vehicle to adopt a low power mode Such low power mode requests may specify a time-window for the low power mode based on satellite availability or based on other criteria, such as the vehicle's on-board battery power falling below a certain level.

When the vehicle's ECU receives a low-power request from an on-board system component or otherwise generates such a request, the vehicle may send its location to a back-office, if it can determine this using its on-board telematics positioning system, or it may alternatively or in addition request its location from a remote server if this is capable of tracking the location of the vehicle remotely. In some examples, the remote server 400 may be configured to obtain the vehicle location from a satellite location info source 500 or other source of satellite determined location information.

In some embodiments of the method shown in FIG. 5, the server 400 may comprise a back office server for the vehicle which is configured to download from the satellite network information source, for example, the satellite network operator 500, a satellite schedule which can be used to determine, based off a vehicle's current or predicted future geographic position, when satellites will be in view of that vehicle. The satellite data may be downloaded by the server in advance of receiving location information from the vehicle, and it may also provide satellite data to the vehicle in advance of either the vehicle or the server performing method 300 in some embodiments. This may allow the vehicle to further refine the MTUs, for example, see 506 or 606 described herein.

Figure 6:
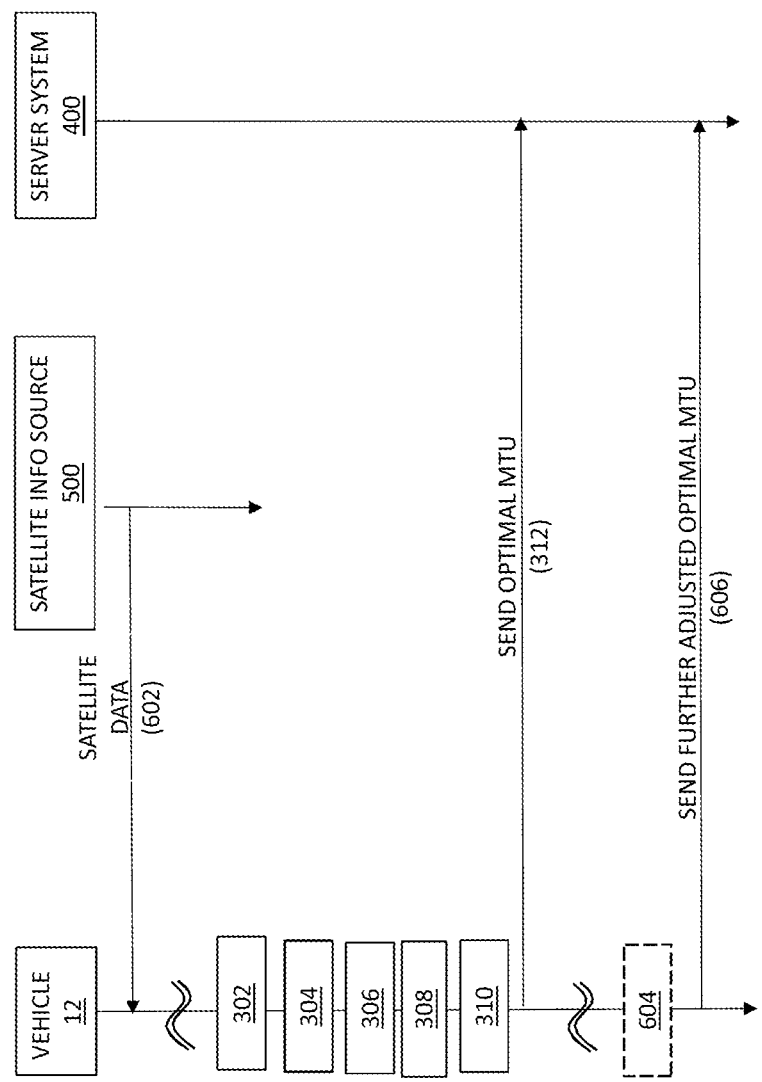
FIG. 6 illustrates schematically an alternative data flow where a vehicle implements a method for controlling vehicle-satellite communications according to some embodiments of the disclosed technology.

The satellite scheduling information may be sent to the vehicle in some embodiments and the vehicle may then use this information to perform method 300, as shown in FIG. 6.

FIG. 6 illustrates schematically an alternative data flow according to some embodiments of the disclosed technology where vehicle 12 performs method 300. As shown in FIG. 6, at some point in advance of performing method 300, the vehicle 12 obtains satellite information 602 from a suitable satellite information source 500. Later, the vehicle determines its geographic location 302 and determines a vehicle-satellite communications channel availability at the determined current vehicle location for vehicle-satellite communications 304. In some embodiments, determining the vehicle-satellite communications channel availability comprises determining at least a start of a time-window where the vehicle could exchange communication messages with a communications satellite and preferably also the end time of that time-window.

The time-windows may be determined based on a current vehicle location but may also be determined in advance of such time-windows, for example, based on a vehicle's planned trajectory, and orbit information for one or more satellites which are passing or which will pass over the vehicle's current or planned location. The vehicle then determines the optimal MTUs for the current or at a predicted future time in 308, for each type of message 306. If determining the duration of a time-window which includes in that time-window the current time, the vehicle may adjust the MTUs used for incoming and outgoing messages dynamically to optimize data throughput during that time window in 310. Otherwise, the predicted MTUs determined in 306 for each type of message, mobile terminating or mobile originating, are shared in 312 with a remote server with which it is configured to communicate, such as server 400. The vehicle may also instead or in addition further adjust MTUs in 604 based on its assessment in real-time of the available sky for communicating with a satellite based on the satellite's orbit data and its determination, based on its sensor system detecting available sky and/or the use of topology information for the terrain surrounding its geographic location. In this case the vehicle may also share in 314 (shown also in FIG. 6 as 606) the adjusted or further adjusted MTUs with a remote server such as server 400, for example, with its back-office server if the vehicle is configured with a back-office server.

The satellite scheduling information provided in either of the schematic data flows shown in FIGS. 5 and 6 may be provided in the form of a message, for example, a SWAP format message in some embodiments. The message is stored by the vehicle 12 in memory in 508, for example, in a vehicle data administration, VDA, database.

Based on the geographic location, which may comprise 2D location information or 3D location+local topology location information, a time window for when a satellite will next be available for a direct vehicle satellite-communications link is determined. In other words, based on when the satellite will be sufficiently overhead to provide network coverage for vehicle-satellite communications with the vehicle, once the topology of the terrain around the vehicle has been taken into account, a time-window for vehicle-satellite communications can be determined.

The satellite may be any suitable satellite which the vehicle and/or a remote server is able to use for vehicle-satellite communications. The vehicle may not always communicate with the server via the satellite, it may be able to communicate via the satellite with other entities. The position of the satellite can be obtained from the orbital information from any suitable source of such information (communications satellite position data is usually available from satellite-communications network providers for example). The satellite position data may be stored on the vehicle or at a remote server or back-office for the vehicle.

The topology data for the terrain may also be obtained in advance, for example, such information may be stored at the server 400 and/or on the vehicle 12. The stored topology data may be limited to data along a planned vehicle route in some embodiments.

Based on the topology of the surrounding terrain which may affect visibility of the satellite in the sky at the location of the vehicle, the duration of any line-of-sight between the vehicle and the satellite can be determined. This in turn determines the duration of the time-window for direct vehicle-satellite communications and the modem can be scheduled to power on or a wake-up from a stand-by power mode to a fully operational power mode when the satellite modem is in view accordingly.

As mentioned above, in some embodiments, other system components such as the telematics gateway of the vehicle are not required to be powered on at the same time as the modem is powered on if suitable buffers are available to store incoming and outgoing messages so that these can be respectively sent and received by the modem during the time-window for vehicle-satellite communications.

In some embodiments, the optimal MTU for outgoing messages is determined sufficiently in advance of the next vehicle-satellite communications time-window so that the optimal MTU can used for any messages generated on the vehicle which are then stored until that vehicle-satellite communications time-window. This allows the vehicle's satellite modem to maintain a separately powered buffer of out-going messages to transmit with optimal MTUs even if the messages are received by the buffer the modem itself is off-line. Messages which generated at the server 400 for the vehicle 12 may also use an MTU which is optimized for the next available vehicle-satellite time-window in some embodiments.

In other words, where the telematics gateway and modem together can be powered independently of each other and/or other system components of the vehicle, they can be woken up and shut-down on a schedule determined by a power controller of the vehicle. This allows when modem is powered on but there is no available vehicle-satellite communications link (or if the modem is not powered on or in a low-power state with no transmission functionality) the telematics gateway to cause outgoing messages with optimized MTUs for the next available vehicle-satellite communications window to be stored in an outgoing modem buffer of the modem. The telematics gateway can also read incoming messages with optimized MTUs that were stored in the modem buffer when the telematics gateway was in a low or no power state.

The transceiver arrangement 404 shown in FIG. 4A may also be used by the vehicle 12 to communicate wirelessly via one or more wireless communications networks which may use other types of communication protocols, for example, depending on its antenna capabilities it may support satellite communications and also provide access to Wi-Fi and/or cellular data communications networks in some embodiments of the disclosed technology.

In some embodiments, the vehicle 12 may comprise an autonomous or semi-autonomous vehicle, and also possibly remote controlled vehicles. Such embodiments of the vehicle 12 will in addition to the components shown in FIG. 4A also comprise a suitable sensory system (not shown in FIG. 4A) to assist with the autonomous navigation and other autonomous capabilities of the vehicle which use such sensory system, a suitable advance driving system can then be implemented by the vehicle to provide output to the vehicles ECU to control the vehicle to operate to a greater or lesser degree autonomously.

It will be apparent to anyone of ordinary skill in the art that some essential vehicle components, for example, the vehicle's propulsion system, which maybe electric and/or a conventional propulsion system, and system controllers configured to receive control signals from the vehicles ECU to control various vehicle system components are omitted from FIG. 4A for the sake of clarity. Also not shown in FIG. 4A are sensors which may be used in embodiments where the vehicle detects unobstructed, for example, visible, sky using its image or other sensor systems, for example, visible cameras may be used. At night or in low visibility conditions, for example, if there is mist or fog, infra-red cameras, radar and/or LIDAR sensor systems may be used to detect unobstructed sky in addition or instead.

Some, if not all, of the above embodiments may be implemented using computer program code which may be provided as software or hardcoded, for example, as a computer program product, compromising modules or circuitry which as are shown in FIG. 4C as being stored either in the memory 404 of the vehicle 12 or in the memory 416 of the server 400. For example, method 300 described above may be performed by the server 400 but also, instead, in some embodiments, it may be performed on-board the vehicle if satellite position information is also stored on the vehicle and if the computer program code modules 418, 420, 422 424, 428, and 430 are also stored in memory 404 on the vehicle from where they can be loaded and executed by the one or more processors, such as, the processors or processing circuitry 406 depicted in FIG. 4A.

If the method is performed by the server 400, then the computer program code modules 418-430 are stored in memory 416 as depicted in FIG. 4B. Accordingly, the computer program code modules 418-430 and optionally one or more other necessary computer program code for performing the functions and actions of the embodiments herein may be provided as a computer program product, for instance in the form of a data carrier carrying computer program code or code means for performing the embodiments herein when being loaded into the processing circuitry in a control system of the vehicle 12 or the server 400.

The data carrier, or computer readable medium, may be one of an electronic signal, optical signal, radio signal or computer-readable storage medium. The computer program code may e.g. be provided as pure program code in a controller of the server 400 in some embodiments.

In embodiments where instead the method 300 is performed on-board the vehicle 12 itself, the electronic control unit 410 of the vehicle or provided by the system server 400 and downloaded to the vehicle's control system in some embodiments. Thus, it should be noted that the corresponding functions used by the control system 410 to implement the method 300 may in some embodiments be implemented as computer programs stored in memory 414, for example, a computer readable storage unit, for execution by processors or processing modules, e.g. the processing circuitry 404 in FIG. 4A.

Those skilled in the art will also appreciate that the processing circuitry and the memory or computer readable storage described above may refer to a combination of analog and digital circuits, and/or one or more processors configured with software and/or firmware, e.g. stored in a memory, that when executed by the one or more processors such as the processing circuitry perform a method 300 as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

A control system of the vehicle, such as the vehicle's ECU also comprises or is capable of controlling how signals are sent wirelessly via an RX/TX antenna arrangement in order for a vehicle 12 to be able to communicate via one or more communications channels with remote entities, for example, the server forming that vehicle's back office server.

The communication channels may be point-to-point, or networks, for example, over cellular or satellite networks which support wireless communications. The wireless communications may conform to one or more public or proprietary communications standards, protocols and/or technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The operating system of the vehicle may further various software components and/or drivers for controlling and managing general system tasks (e.g., memory management, storage device control, power management, etc.) and facilitates communication between various hardware and software components.

Where the disclosed technology is described with reference to drawings in the form of block diagrams and/or flowcharts, it is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The description of the example embodiments provided herein have been presented for the purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements, features, functions, or steps than those listed and the words "a" or "an" preceding an element do not exclude the presence of a plurality of such elements, features, functions, or steps. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of methods, and may refer to elements, functions, steps or processes, one or more or all of which may be implemented in one aspect by a computer program product, embodied in a computer-readable medium, including computer-executable instructions, such as program code, executed by computers in networked environments.

A computer-readable medium may include removable and non-removable storage devices including, but not limited to, Read Only Memory (ROM), Random Access Memory, RAM), which may be static RAM, SRAM, or dynamic RAM, DRAM. ROM may be programmable ROM, PROM, or EPROM, erasable programmable ROM, or electrically erasable programmable ROM, EEPROM. Suitable storage components for memory may be integrated as chips into a printed circuit board or other substrate connected with one or more processors or processing modules, or provided as removable components, for example, by flash memory (also known as USB sticks), compact discs (CDs), digital versatile discs (DVD), and any other suitable forms of memory. Unless not suitable for the application at hand, memory may also be distributed over a various forms of memory and storage components, and may be provided remotely on a servers, such as may be provided by a cloud-based storage solution. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The memory used by any apparatus whatever its form of electronic apparatus described herein accordingly comprise any suitable device readable and/or writeable medium, examples of which include, but are not limited to: any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry. Memory may store any suitable instructions, data or information, including a computer program, software, an application including one or more of logic, rules, code, tables, etc. and/or other instructions capable of being executed by processing circuitry and, utilized by the apparatus in whatever form of electronic apparatus. Memory may be used to store any calculations made by processing circuitry and/or any data received via a user or communications or other type of data interface. In some embodiments, processing circuitry and memory are integrated. Memory may be also dispersed amongst one or more system or apparatus components. For example, memory may comprises a plurality of different memory modules, including modules located on other network nodes in some embodiments.

In the drawings and specification, there have been disclosed exemplary aspects of the disclosure. However, many variations and modifications can be made to these aspects which fall within the scope of the accompanying claims. Thus, the disclosure should be regarded as illustrative rather than restrictive in terms of supporting the claim scope which is not to be limited to the particular examples of the aspects and embodiments described above. The invention which is exemplified herein by the various aspects and embodiments described above has a scope which is defined by the following claims.

The invention claimed is:

1. A method of controlling communications over a satellite communications channel used by a satellite-communications enabled vehicle, the method comprising:
   determining a current vehicle geographic location;
   determining satellite-communications channel availability for the vehicle at the determined current vehicle location; and
   dynamically adjusting a maximum transmission unit, MTU, used by the vehicle for communications over a current or next available satellite-communications channel based on a predicted optimal MTU for the geographic location of the vehicle and the determined satellite-communications channel availability, wherein the dynamic adjustment of the MTU increases the data volume which can be communicated between the vehicle and a communications satellite using the respective current or next available satellite-communications channel.

2. The method of claim 1, wherein the adjusted MTU is dependent on whether a communications comprises a mobile originating, MO, message sent by the vehicle or a mobile terminating, MT, message received by the vehicle.

3. The method of claim 1, wherein the MTU is dynamically adjusted based on a predicted MTU determined from the current geographic location of the vehicle and one or more predicted characteristics of the current communications channel.

4. The method of claim 1, wherein the method further comprises:
storing settings for at least one default optimal MTU for one or more predetermined areas over which an orbit of the communications satellite passes.

5. The method of claim 1, wherein the method further comprises:
storing settings for at least one default optimal MTU for one or more predetermined areas over which an orbit of the communications satellite passes, wherein the settings for at least one default optimal MTU for vehicle-satellite communications for the one or more predetermined areas comprise:
a default optimal MTU setting for mobile terminating, MT, messages; and
a different default optimal MTU setting for mobile originating, MO, messages,
where the default optimal MTU settings are stored in association with a communication channel identifier as extended communication settings for the vehicle.

6. The method of claim 1, wherein the method is performed by the vehicle.

7. The method of claim 1, wherein the method is performed by a server.

8. The method of claim 1, wherein the method is performed by a server and the method further comprises:
receiving, at the server, a request from the vehicle, for a predicted optimal MTU for satellite communications at a location; and
sending a MTU for satellite communications over the satellite communications channel, the MTU comprising a dynamically adjusted a maximum transmission unit, MTU, for the location to the vehicle in response to processing the received request.

9. The method of claim 1, wherein the method is performed by a server and the method further comprises:
receiving, at the server, a request from the vehicle, for a predicted optimal MTU for satellite communications at a location; and
sending a MTU for satellite communications over the satellite communications channel, the MTU comprising a dynamically adjusted a maximum transmission unit, MTU, for the location to the vehicle in response to processing the received request,
and wherein the method further comprises:
receiving the location of the vehicle determined by the vehicle's positioning system; and/or
obtaining the location of the vehicle directly from a gateway to a satellite network including the satellite.

10. The method of claim 1 performed by a server, the method further comprising:
storing settings for at least one default optimal MTU for one or more predetermined areas over which an orbit of the communications satellite passes, wherein the settings for at least one default optimal MTU for vehicle-satellite communications for the one or more predetermined areas comprise:
a default optimal MTU setting for mobile terminating, MT, messages; and
a different default optimal MTU setting for mobile originating, MO, messages,
where the default optimal MTU settings are stored in association with a communication channel identifier as extended communication settings for the vehicle,
and wherein the default settings are stored by the server in association with a communication channel identifier and a vehicle chassis identifier as extended communication settings for the vehicle, and wherein the method further comprises at the server:
retrieving, using the vehicle chassis identifier, a default MTU associated with that vehicle chassis identifier, to use when transmitting a MT message over a satellite communication channel to a vehicle.

11. The method of claim 1 performed by a server, the method further comprising:
storing settings for at least one default optimal MTU for one or more predetermined areas over which an orbit of the communications satellite passes, wherein the settings for at least one default optimal MTU for vehicle-satellite communications for the one or more predetermined areas comprise:
a default optimal MTU setting for mobile terminating, MT, messages; and
a different default optimal MTU setting for mobile originating, MO, messages,
where the default optimal MTU settings are stored in association with a communication channel identifier as extended communication settings for the vehicle,
and wherein the default settings are stored by the server in association with a communication channel identifier and a vehicle chassis identifier as extended communication settings for the vehicle, and wherein the method further comprises at the server:
retrieving, using the vehicle chassis identifier, a default MTU associated with that vehicle chassis identifier, to use when transmitting a MT message over a satellite communication channel to a vehicle; and
further comprising at the server:
automatically updating one or more of the at least one default MTU settings for the vehicle responsive to receiving an indication that the geographic location of the vehicle has changed to an area associated with at least one different default MTU settings.

12. The method of claim 1 performed by a server, the method further comprising:
storing settings for at least one default optimal MTU for one or more predetermined areas over which an orbit of the communications satellite passes, wherein the settings for at least one default optimal MTU for vehicle-satellite communications for the one or more predetermined areas comprise:
a default optimal MTU setting for mobile terminating, MT, messages; and
a different default optimal MTU setting for mobile originating, MO, messages,
where the default optimal MTU settings are stored in association with a communication channel identifier as extended communication settings for the vehicle,
and wherein the default settings are stored by the server (in association with a communication channel identifier and a vehicle chassis identifier as extended communication settings for the vehicle, and wherein the method further comprises at the server:
retrieving, using the vehicle chassis identifier, a default MTU associated with that vehicle chassis identifier, to use when transmitting a MT message over a satellite communication channel to a vehicle; and
further comprising at the server:
automatically updating one or more of the at least one default MTU settings for the vehicle responsive to receiving an indication that the geographic location of the vehicle has changed to an area associated with at least one different default MTU settings;
determining a stored default MTU setting item has changed based on a satellite location; and
sending to a vehicle having a vehicle chassis identifier associated with the stored default MTU setting, a message indicating the new MTU setting.

13. The method of claim 1 performed by a server, where the method further comprises at the vehicle:
the vehicle determining unobstructed sky to further adjust the predicted start and end of the time-window for vehicle-satellite communications; and adjusting the optimal MTU of at least outgoing messages, and wherein the method further comprises at the server:
receiving a message from the vehicle;
determining an adjusted optimal MTU has been used for the message sent by the vehicle to the server; and
based on the adjustment, adjusting the optimum MTU for messages sent to the vehicle.

14. A satellite-communications enabled vehicle, the vehicle comprising:
a satellite modem;
a transceiver/antenna arrangement;
one or more processors or processing circuitry;
a memory, and
an electronic control system, ECU,
wherein the vehicle is configured to receive new default MTU settings for a satellite communications channel, wherein the new default MTU settings are based on:
a current vehicle geographic location;
satellite-communications channel availability for the vehicle at the determined current vehicle location; and
a dynamically adjusted a maximum transmission unit, MTU, for use by the vehicle for communications over the current or next available satellite-communications channel based on a predicted optimal MTU for the geographic location of the vehicle and the determined satellite-communications channel availability.

15. The vehicle of claim 14, wherein the vehicle is further configured to maintain an on-board mapping of the optimal MTU for an off-line communications channel based on its geographic location at a given time.

16. The vehicle of claim 14, wherein the vehicle is configured to:
determine unobstructed sky at its location;
based on the determined unobstructed sky, further adjust a predicted start and end of a time-window for vehicle-satellite communications; and
based on the adjusted time-window, adjust the outgoing message optimal MTU.

17. Apparatus configured to control satellite-communications between a server and a satellite-communications enabled vehicle, the apparatus comprising:
memory;
one or more processors or processing circuitry; and
computer program code stored in the memory, wherein the computer program code is configured, when loaded from the memory and executed by the one or more processors or processing circuitry to cause the apparatus to implement a method of controlling communications over a satellite communications channel used by a satellite-communications enabled vehicle, the method comprising:
determining a current vehicle geographic location;
determining satellite-communications channel availability for the vehicle at the determined current vehicle location; and
dynamically adjusting a maximum transmission unit, MTU, used by the vehicle for communications over a current or next available satellite-communications channel based on a predicted optimal MTU for the geographic location of the vehicle and the determined satellite-communications channel availability, wherein the dynamic adjustment of the MTU increases the data volume which can be communicated between the vehicle and a communications satellite using the respective current or next available satellite-communications channel.

18. A computer-program product comprising computer code, which, when loaded from a memory and executed by one or more processors or processing circuitry of an apparatus cause the apparatus to implement a method of controlling communications over a satellite communications channel used by a satellite-communications enabled vehicle, the method comprising:
determining a current vehicle geographic location;
determining satellite-communications channel availability for the vehicle at the determined current vehicle location; and
dynamically adjusting a maximum transmission unit, MTU, used by the vehicle for communications over a current or next available satellite-communications channel based on a predicted optimal MTU for the geographic location of the vehicle and the determined satellite-communications channel availability, wherein the dynamic adjustment of the MTU increases the data volume which can be communicated between the vehicle and a communications satellite using the respective current or next available satellite-communications channel.

19. The computer program-product of claim 18, wherein the apparatus comprises a vehicle.

20. The computer program-product of claim 18, wherein the apparatus comprises a server.

* * * * *